United States Patent
Aaron

(10) Patent No.: US 7,623,841 B2
(45) Date of Patent: *Nov. 24, 2009

(54) USER TERMINALS AND COMPONENTS CONFIGURED TO ADJUST A COMMUNICATION MODE THEREOF BASED ON EMERGENCY STATE INFORMATION

(75) Inventor: Jeffrey A. Aaron, Atlanta, GA (US)

(73) Assignee: AT&T Intellectual Property I, L.P., Reno, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 12/050,747

(22) Filed: Mar. 18, 2008

(65) Prior Publication Data

US 2009/0004998 A1 Jan. 1, 2009

Related U.S. Application Data

(63) Continuation of application No. 11/584,293, filed on Oct. 20, 2006, now Pat. No. 7,346,335, which is a continuation of application No. 11/010,005, filed on Dec. 10, 2004, now Pat. No. 7,127,230.

(51) Int. Cl.
*H04M 11/00* (2006.01)

(52) U.S. Cl. ............... 455/404.1; 455/404.2; 455/423; 348/14.01

(58) Field of Classification Search ... 455/404.1–404.2, 455/423, 411, 458, 452.2, 453, 502, 566, 455/552.1; 348/140.1–14.07, 554, 568; 379/37–51
See application file for complete search history.

(56) References Cited

U.S. PATENT DOCUMENTS

| | | | |
|---|---|---|---|
| 6,374,099 B1 | 4/2002 | Bi et al. | |
| 6,799,031 B1 | 9/2004 | Lewiner et al. | |
| 7,002,985 B2 | 2/2006 | Dertz et al. | |
| 7,127,230 B2 | 10/2006 | Aaron | |
| 7,206,567 B2 * | 4/2007 | Jin et al. | 455/404.1 |
| 7,346,335 B2 * | 3/2008 | Aaron | 455/404.1 |
| 2002/0098858 A1 | 7/2002 | Struhsaker | |
| 2002/0118797 A1 | 8/2002 | Masuda | |
| 2003/0157923 A1 | 8/2003 | Tani | |
| 2003/0222973 A1 * | 12/2003 | Hiroi et al. | 348/14.01 |
| 2004/0198413 A1 | 10/2004 | Smith et al. | |
| 2004/0203563 A1 | 10/2004 | Menard | |
| 2004/0218609 A1 | 11/2004 | Foster et al. | |
| 2005/0009547 A1 | 1/2005 | Harris et al. | |
| 2005/0070258 A1 | 3/2005 | Stanco | |
| 2005/0097261 A1 | 5/2005 | Jung | |
| 2006/0009191 A1 | 1/2006 | Malone, III | |
| 2006/0048196 A1 | 3/2006 | Yau | |
| 2006/0178128 A1 | 8/2006 | Eaton et al. | |
| 2006/0223553 A1 | 10/2006 | Reisgies | |
| 2007/0173225 A1 | 7/2007 | Aaron | |

* cited by examiner

*Primary Examiner*—Kamran Afshar
(74) *Attorney, Agent, or Firm*—Myers Bigel Sibley & Sajovec, P.A.

(57) ABSTRACT

A method for providing communications services in a network can include adjusting a mode of communication for devices operating in the network based on emergency state information. Related user terminals, computer program products, and components are also disclosed.

2 Claims, 5 Drawing Sheets

USER TERMINALS AND COMPONENTS CONFIGURED TO ADJUST A COMMUNICATION MODE THEREOF BASED ON EMERGENCY STATE INFORMATION

CROSS-REFERENCE TO RELATED APPLICATIONS

This application is a continuation application of and claims priority to patent application Ser. No. 11/584,293, filed Oct. 20, 2006, now U.S. Pat. No. 7,346,335, which itself is a continuation of application Ser. No. 11/010,005, filed Dec. 10, 2004, now U.S. Pat. No. 7,127,230, the content of which is incorporated herein by reference in its entirety.

FIELD OF THE INVENTION

This invention relates to computing devices, and more particularly to such devices supporting a variety of different applications.

BACKGROUND OF THE INVENTION

Given the proliferation of communication systems, more and more users are becoming accustomed to having essentially access to such communication systems at any time and any place. Many communication systems are designed, however, with the underlying assumption and only a fraction of all users are statistically likely to access the system at one time. For example, some communication systems may be designed with the assumption that a maximum of 60% of the subscribers to the system may access the system simultaneously. Accordingly, if the number of users accessing the system exceeds this assumption, the system may be overloaded so that performance is degraded and/or the system fails.

One type of overload situation can be generally described as emergency related. In such emergency related overloads, many users may attempt to access the communication system simultaneously in response to a large or widely reported emergency, such as a terrorist attack. Moreover, in such emergency situations, access to the communications system may be even more vital than in other situations. This is true not only for emergency services personnel but for many of the ordinary users who may need to communicate with one another to learn basic information such as the general well being of another user and where/when to meet in view of the emergency situation.

SUMMARY OF THE INVENTION

Embodiments according to the invention can provide methods, user terminals, computer program products, and components for providing communications in emergency situations. Pursuant to these embodiments, a method for providing communications services in a network can include adjusting a mode of communication for devices operating in the network based on emergency state information.

In some embodiments according to the invention, the method can further include monitoring information associated with increased communications demands for the network and determining the emergency state information based on the information associated with increased communications demands for the network. The mode of communication can be determined based on the emergency state information and the emergency mode messages can be transmitted to devices in the network based on the emergency state information to synchronize the devices.

In some embodiments according to the invention, the emergency mode messages can be first emergency mode messages and the method can further include monitoring receipt of status message from devices responsive to the first emergency mode messages transmitted to the devices. Second emergency mode messages can be transmitted to the devices not responding to the first emergency mode messages within a time-out interval. An alarm can be activated if a number of devices do not respond to the first and second emergency mode messages within the time-out interval.

In some embodiments according to the invention, transmitting emergency mode messages includes transmitting different emergency mode messages to different devices having different emergency mode compatibilities. In some embodiments according to the invention, adjusting can include adjusting the mode of communication to increase or decrease an amount of permissible bandwidth for the devices based on changes in the emergency state information.

In some embodiments according to the invention, adjusting can include adjusting the mode of communication to a normal mode of communication responsive to determining adequate network resources are available and after an additional time interval. In some embodiments according to the invention, adjusting can include adjusting the mode of communication responsive to a manual input.

In some embodiments according to the invention, determining emergency state information can include authenticating information including weather information, traffic information, emergency broadcast information, broadcast media information, security information, network traffic information, and/or 911 emergency information. The authenticated information can be filtered to block a portion of the authenticated information. The emergency state information can be determined based on the filtered authenticated information.

In some embodiments according to the invention, the mode of communication can be a normal mode, a limited audio mode, a text mode, a limited text mode, a video mode, and/or a limited video mode.

In some embodiments according to the invention, the mode of communication further includes one of a plurality of different codecs to be used for audio and/or video, one of a plurality of different compression modes to be used for audio and/or video, a Transmission Control Protocol/Internet Protocol (TCP/IP) communication mode, a User Data Protocol (UDP) communication mode, a shortcut based communication mode, a hotkey based communication mode, an abbreviation based communication mode, and a communications mode having a predetermined number of messages and/or amount of time allocated for use.

In some embodiments according to the invention, determining the emergency state information can include accumulating different types of filtered authenticated information separately to provide accumulated information. The accumulated information can be weighted separately based on database information. The weighted accumulated information can be combined to provide the emergency state information. In some embodiments according to the invention, accumulating can include accumulating different types of filtered authenticated information separately to provide accumulated information based on the database information. In some embodiments according to the invention, a computer program product is configured to operate the method.

In some embodiments according to the invention, a user terminal for use in a communications network includes a transceiver configured to transmit/receive communications to a communications network according to an emergency communications mode and a processor circuit coupled to the transceiver circuit configured to activate the emergency communications mode responsive to an emergency message received from the network based on emergency state information.

In some embodiments according to the invention, a component for use in routing communications in a communications network includes a processor circuit configured to activate the emergency communications mode responsive to an emergency message received from the network based on emergency state information.

DETAILED DESCRIPTION OF EMBODIMENTS ACCORDING TO THE INVENTION

Figure 1:
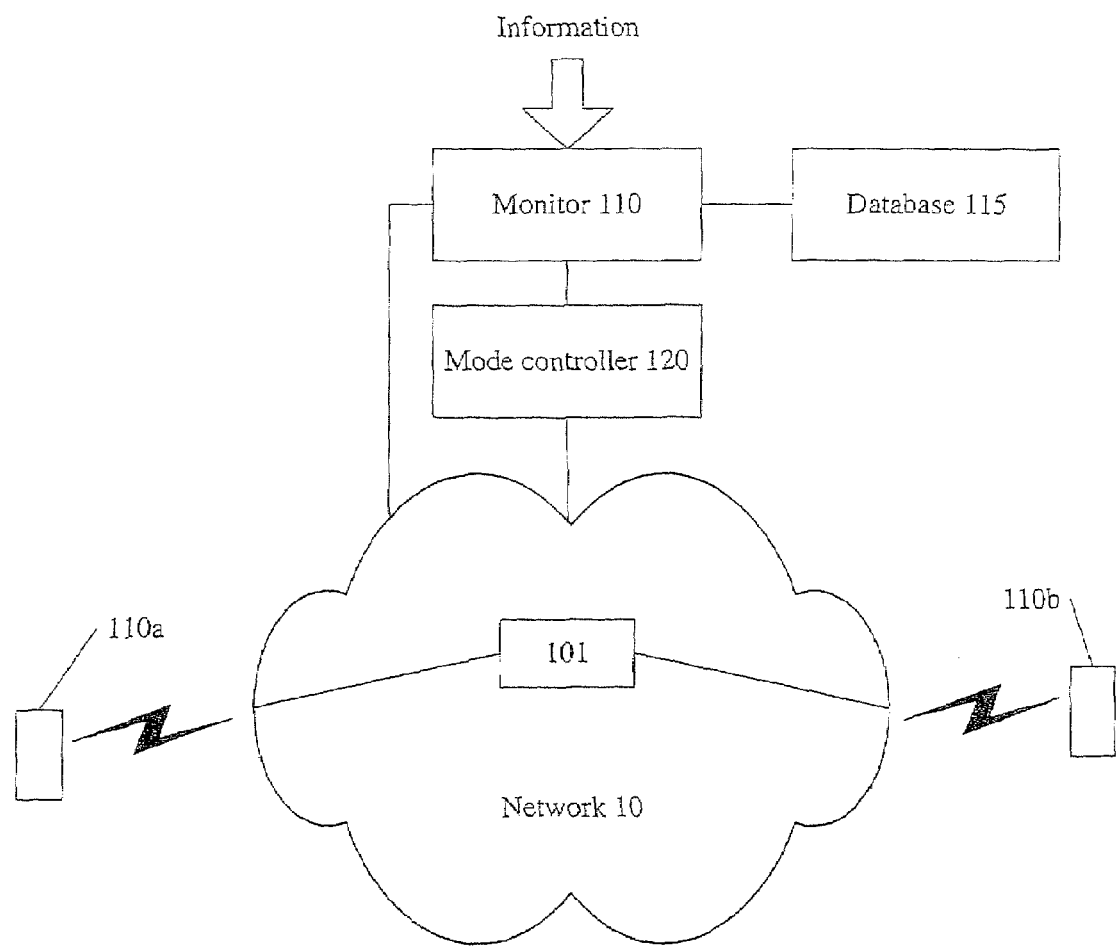
FIG. 1 is a schematic diagram of a communication system according to some embodiments in the invention.

The present invention now will be described more fully hereinafter with reference to the accompanying figures, in which embodiments of the invention are shown. This invention may, however, be embodied in many alternate forms and should not be construed as limited to the embodiments set forth herein. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the term "and/or" includes any and all combinations of one or more of the associated listed items.

It will be understood that, when an element is referred to as being "coupled" to another element, it can be directly coupled to the other element or intervening elements may be present. In contrast, when an element is referred to as being "directly coupled" to another element, there are no intervening elements present. Like numbers refer to like elements throughout.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense expressly so defined herein.

The present invention is described below with reference to block and flowchart illustrations of methods, apparatus (systems) and/or computer program products according to embodiments of the invention. It is understood that each block of the diagrams, and combinations thereof, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block or blocks.

The invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Embodiments according to the invention may be used to adjust a mode of communication for devices in a network based on emergency state information. For example, systems according to embodiments of the invention may monitor various types of information that can be associated with an emergency situation, such as 911 emergency information or emergency broadcast information.

The system can further determine emergency state information based on the monitored information by separately accumulating and rating different types of information. This determination is provided in the form of emergency state information that can be used to determine an emergency mode that can be transmitted to devices in the communications system in the form of emergency messages. The emergency messages indicate to devices included in the communications system (such as cellular radio telephones and components of mobile switching centers) which supported communications mode should be used. The communications modes may utilize reduced bandwidth within the communications systems so that more users may gain access to the system and communicate with others at a reduced bandwidth, such as reduced quality audio and/or reduced quality video and/or reduced text including and/or via short cuts, hot keys, etc. Therefore, in emergency situations when excessive demands may be placed on the communications system, access to a greater number of users may be provided by reducing the allowable bandwidth allocated for devices accessing the communications system. In this way, users may be able to access the system to gain basic information regarding the situation and/or information regarding other users such as general status information.

FIG. 1 is a block diagram of a communications system according to some embodiments of the invention. As shown in FIG. 1, a communications system 10 includes at least one component 101 used to route and/or switch and/or transport communications from sources to destinations serviced by the communications system 10. For example, user terminal 110a may access the communications system 10 to place a call to user terminal 110a to conduct two-way communications therebetween. It will be understood that the communications system 10 may be any communications system known to those skilled in the art and can include mobile switching centers that are common in servicing cellular radio telephone networks and/or a public switch telephone network for connection to wired user terminals (sometimes referred to as "landlines") and/or a data communications network such as the Internet. It will be further understood that the user terminals 110a/b, according to some embodiments of the invention support emergency mode communications as described herein and may otherwise function as conventional radio telephones or landline terminals.

As further shown in FIG. 1, a monitor circuit 110 is configured to monitor information that may be associated with emergency situations. In some embodiments according to the invention, the information monitored by the monitor circuit 110 can include weather information, traffic information, emergency broadcast information (such as that which is commonly broadcast over radio), broadcast media information (such as radio or television news bulletins), security information (such as that broadcast over police and/or fire and/or military and/or national guard and/or government agency radio and landline networks), 911 emergency information, network traffic information that may be ascertained from unusual spikes in network activity which may be limited to certain geographic regions and may indicate local events of interest including emergency situations. It will be further understood that the monitored information may also include information typically posted via the Internet, such as on web pages.

The monitor circuit 110 can authenticate the monitored information by monitoring the information via trusted channels that are, for example, encrypted or cryptographically authenticated or otherwise protected so that the monitor circuit 110 can have a high confidence in the authenticity of the information being monitored. It will be further understood that the monitoring circuit 110 may authenticate the information by comparing information from separate sources. Other types of authentication can be used additionally or alternately.

The monitor circuit 110 is in communication with a database 115 that can store, for example, historical information that relates previously monitored information with past emergency and/or non-emergency situations. For example, the database 115 may store information indicating what types of patterns have been observed in the past prior to emergency situations. The authenticated information can also be filtered, for example, by applying a context to the authenticated information such as when it is known that a particular event is occurring, which may indicate the some information can either be fully/partially discounted or should be monitored with heightened sensitivity. The monitor circuit 110 may utilize the information included in the database 115 to process the monitored information to provide emergency state information (such as using a numerical scale) reflecting how likely it is that the monitored information indicates a valid emergency situation and/or the seriousness/degree of the emergency.

Still referring to FIG. 1, a mode controller circuit 120 can determine a mode of communication to be used by the devices included in the network 10 (and the devices accessing the network 10) to allow continued (but otherwise reduced) access to the communications network during a valid emergency situation. In particular, the mode controller circuit 120 can select an emergency mode of communication based on the emergency state information provided by the monitoring circuit 110. For example, the mode controller circuit 120 may enable one of several different emergency communications modes based on how likely it is that an emergency situation exists and/or the degree of the emergency especially with respect to its potential impact on the communications network. For example, if the emergency state information indicates that it is highly likely that a valid emergency situation exists and/or that the emergency is highly serious, the mode controller circuit may initiate an emergency mode that allows users to access the communications network only using reduced text mode whereby users can communicate using shorthand messages made available at the user terminals 100. This mode may require only minimal bandwidth and/or minimal other network resources per user. In other less severe emergency situations, the mode controller circuit 120 may initiate a low quality audio emergency mode whereby user terminals 100 may access the communications network 10 but may only transmit and receive audio information at a relatively low quality thereby utilizing less bandwidth than in a normal mode. This mode may thus require less network bandwidth/resources per user than normal mode but more than in the reduced text mode.

When the mode controller circuit 120 determines which emergency mode to activate, the mode controller circuit 120 transmits emergency messages to the devices included in the communications network 10 as well as those user terminals which access the communications network 10. After transmission of the emergency messages, the mode controller 120 monitors the status of each of the devices and terminals to determine whether those devices and terminals actually have entered the appropriate emergency mode of operation. For example, the mode controller circuit may await return messages from each of the devices and terminals indicating that the respective devices and terminals have initiated the corresponding emergency mode and is now "synchronized" to communicate with other devices and terminals so configured, i.e. using the same mode and/or compatible modes.

Once the appropriate mode and/or set of modes is established among the network 10, the devices may communicate with other devices that are so configured. For example, referring to FIG. 1, user terminal 110a may communicate with user terminal 110b (and vice versa) via device 101 if the user terminals 110a/b and the device 101 are in synchronization (i.e., using the same or at least compatible emergency modes of communications). Furthermore, the device 101 included in the path between user terminals 100a/b is also configured for the same or a compatible emergency communications mode.

After some time, the monitoring circuit 110 may determine that the emergency situation has become less severe or was not actually a valid emergency situation. Accordingly, the monitoring circuit 110 may reduce the emergency state information thereby allowing the mode controller circuit 120 to adjust the emergency mode among the devices in the network 10 so that improved and, ultimately, normal operations may be resumed.

Figure 2:
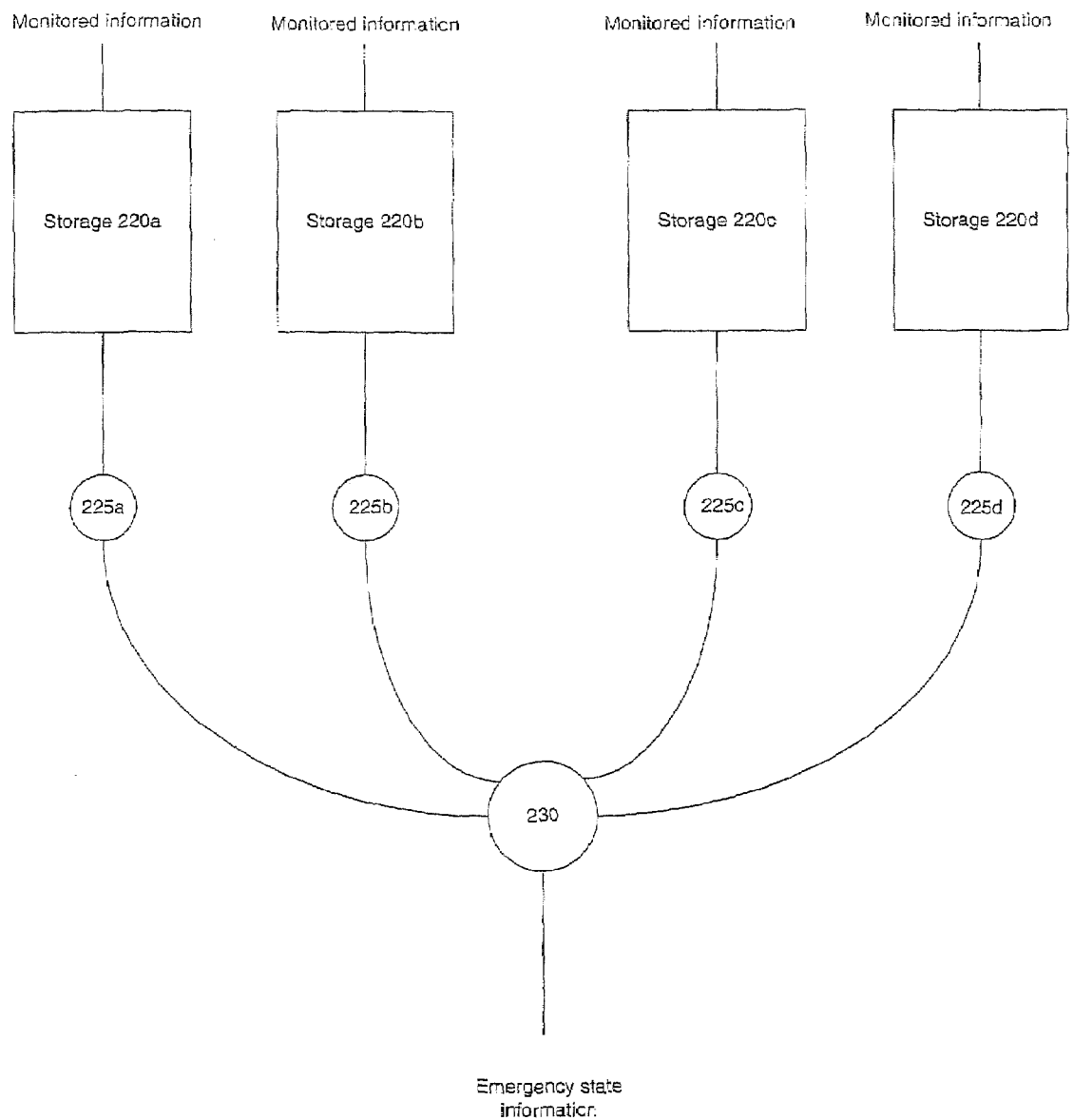
FIG. 2 is a block diagram of a monitor circuit according to some embodiments in the invention.

FIG. 2 is a block diagram illustrating a monitor circuit in greater detail according to some embodiments of the invention. As shown in FIG. 2, the monitor circuit 110 includes separate storage areas for different types of information that may be associated with emergency situations monitored by the monitor circuit 110. In particular, the monitor circuit 110 includes four separate storage areas 220a-d used to store authenticated information from information sources such as those described above in reference to FIG. 1 that may indicate the occurrence of an emergency.

It will be understood that the information in the database 115 can be used to determine which types of information are collected in the storage areas 220a-d. For example, in some embodiments according to the invention, information in the database 115 may be used to collect only a subset of the information that is otherwise monitored. It will be further understood that other embodiments according to the invention can use more or fewer storage areas 220. The information collected in the storage areas 220a-d are provided to respective weighting circuits 225a-d which can separately weight information collected by a respective one of the storage areas 220a-d. Furthermore, in some embodiments according to the invention, information from the database 115 can also be used to set or modify the amount of weighting used for the type of information collected. For example, in some embodiments according to the invention, certain types of information collected may be determined to be more pertinent in an emergency situation than other types of information collected. The more pertinent information may therefore be weighted more heavily in determining emergency state information provided by the monitoring circuit 110.

It will be further understood that the information from the database 115 may be used to vary the weighting and/or collection of information over time and even as an emergency situation develops. For example, in some embodiments according to the invention, a certain type of information that is monitored may indicate the initiation of an emergency situation. Later, a different type of information may be more pertinent as to the nature or severity of the emergency while the emergency is ongoing. Furthermore, a third type of information may be most pertinent during the later stages of the emergency or the time immediately following an emergency. The weighted information is then combined by a combiner circuit 230 to provide the emergency state information from the monitoring circuit 110.

Figure 3:
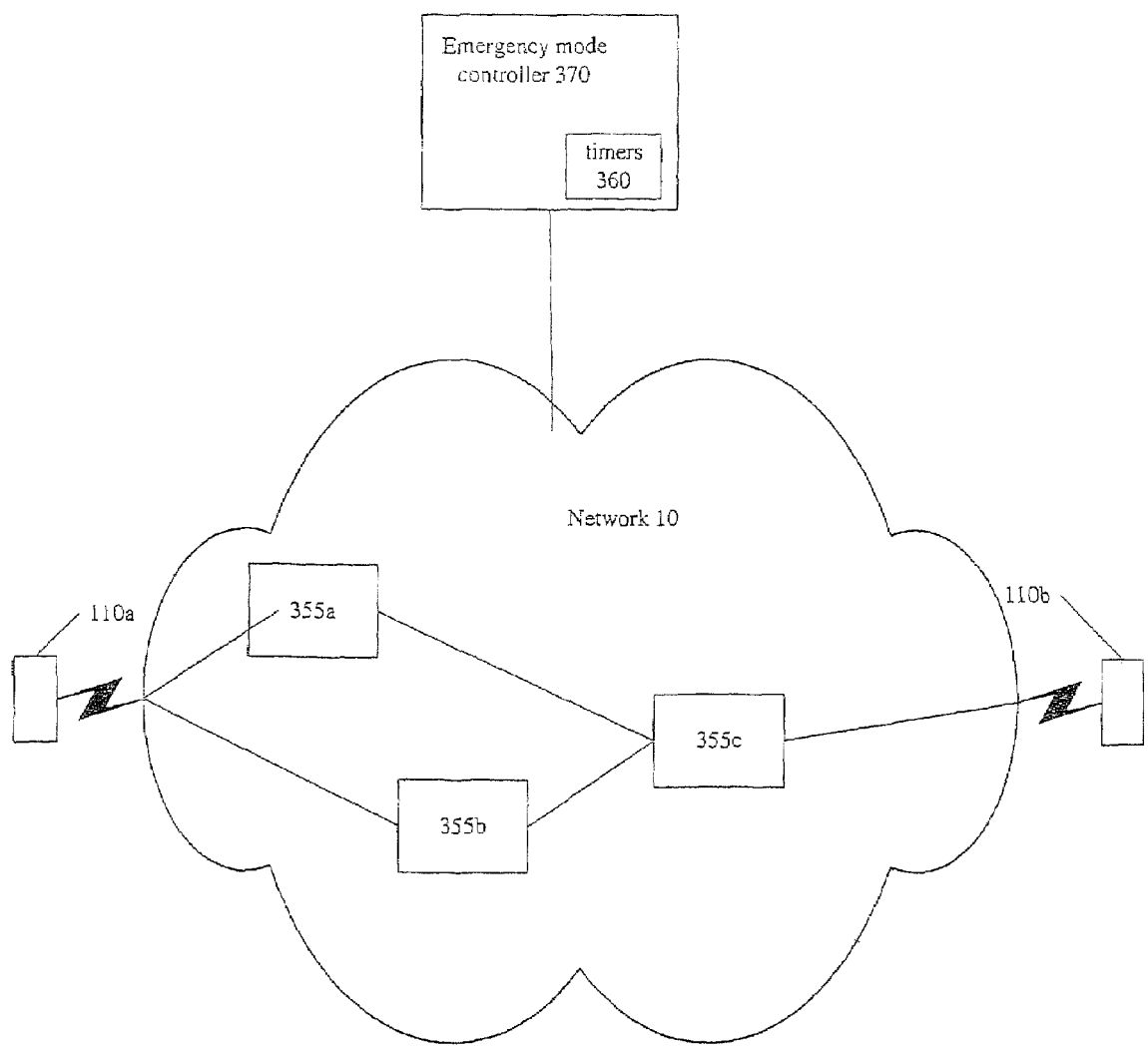
FIG. 3 is a block diagram of an emergency mode controller circuit operatively coupled to a communication system according to some embodiments in the invention.

FIG. 3 is a block diagram that illustrates an emergency mode controller circuit 370 operatively coupled to the network 10 including the user terminals 100a,b. In operation, the emergency mode controller circuit 270 is provided with the emergency state information determined by the monitoring circuit 110 and can determine an emergency mode based thereon. In some embodiments according to the invention, the emergency mode controller circuit 370 may support several different types of emergency modes of communication such as a reduced audio mode, a text only mode, a reduced text mode, and/or a reduced video mode.

In the reduced audio and/or video mode, audio and/or video communications may be available to the user terminals 100a,b when accessing the network 10 but at a lower quality than normally provided. It will be understood that any number of different audio and/or video quality levels may be provided within the reduced audio and/or video mode based on the severity of the emergency and the available resources. For example, the reduced audio and/or video mode may include several submodes based upon the particular type of codec that is employed to code and decode audio information. Furthermore, the reduced audio and/or video mode may also be based upon the type of compression used (such as MPEG) which may be varied based on the severity of the emergency. In particular, an MPEG based audio and/or video compression/decompression may be adjusted so that greater compression is performed when less bandwidth is available whereas less compression is used when more resources are available.

The text only mode may entail the user terminals 100a,b only accessing the network 100 for text messaging. In such embodiments according to the invention, user terminals may be limited to sending what is commonly referred to as text messages to other users and may not access the communications network 10 for audio and/or video calls. In some embodiments according to the invention, the user terminals are configured to send/receive Short Message Service (SMS) or Enhanced Message Service (EMS) formatted messages, Multimedia Message Service (MMS), and/or Smartmessaging™ formatted messages. As is known to those skilled in the art, SMS and EMS messages can be transmitted on digital networks, such as GSM networks, allowing relatively small text messages (for example, 160 characters in size) to be sent and received via the network operator's message center to the mobile device 20, or from the Internet, using a so-called SMS (or EMS) "gateway" website. If the mobile device 20 is powered off or out of range of the network, the SMS messages (or commands) can be stored by the network 10, and may be delivered later when the mobile device 20 is available.

MMS is a messaging system for asynchronous messaging, which is based on the SMS standard, but which enables communication of messages containing "rich media" content, i.e., content of types that tend to be more data-intensive than text, such as such as graphics, digital photographs, video, animation, sound files, and/or audio. MMS is standardized by the WAP Forum and the Third-Generation Partnership Project (3GPP) and is described in: "WAP MMS, Architecture Overview," WAP-205, WAP Forum (Approved Version Apr. 25, 2001); "WAP MMS, Client Transactions Specification," WAP-206, WAP Forum (Approved Version Jan. 15, 2002); "WAP MMS, Encapsulation Specification," WAP-209, WAP Forum (Approved Version Jan. 5, 2002); "Requirements", 3GPP specification 22.140; and "Architecture and Functionality," 3GPP specification 23.140.

The reduced text mode may be provided by the predetermined shortcuts, abbreviations, hot keys etc. provided the user terminals 100a,b. In particular, the user terminals 100a,b may include predetermined messages that can be transmitted, for example, using various types of shorthand keystrokes such as hot keys. In some embodiments according to the invention, the messages are available via a series of menus that can be accessed via the user interface of the user terminal 100 whereupon selected messages can be transmitted to the destination. The user terminal that receives the messages can translate the message format to text for display.

It will be further understood that the emergency mode messages may also be transmitted to devices, such as components 355a-c in the network 10 and other components used to route communications through the network 10, so that those components may process communications according to the activated emergency mode determined by the emergency mode controller circuit 370. Moreover, components located at the boundary of the network 10 (i.e., those components that normally accept connections from the user terminals) can refuse connections that are not compatible with the selected emergency mode. For example, if a user terminal 100 attempts to make an audio call via the network 10, the components 355a-b, which would normally route the call, are configured to refuse the connection as a normal call is not supported by the network 10 when operating in an emergency mode.

It will be understood that the components 355a-c can be any component included in a network used to route and/or switch and/or transport communications between users. For example, in some embodiments according to the invention, the components 355a-c can be components of a mobile switching center. In some embodiments according to the invention, the components 355a-c can be components of a public switched telephone network, a private branch exchange, or a router or firewall or server on the Internet that is connected to the network 10. It will be understood that the components can operate under the control of a processor, which may be integrated with the component or remote from the component.

In some embodiments according to the invention, some components may not be compatible with or support all emergency modes selectable by the emergency mode controller circuit 370. For example, some user terminals may not provide support for any emergency modes of communication whereas others may support only a subset thereof. Accordingly, components included in the network 10 may support some or all of the emergency modes so that communications may be routed along a path wherein each component provides support for at least the communications mode selected by the emergency mode controller circuit 370. However, some components that receive an emergency message from the emergency mode controller circuit 370 may be unable to provide emergency mode communications compliant with that selected by the emergency mode circuit 370. Accordingly, each device in the network 10 that receives an emergency message may respond with a corresponding emergency message response to the emergency mode controller circuit 370 verifying whether the respective component has been configured for the selected emergency communications mode.

It will further be understood that in some embodiments according to the invention, the emergency mode controller circuit 370 may include timer circuits 360 that time the intervals between transmission of an emergency message to a particular component and a corresponding response from that component. If a component fails to respond with the corresponding emergency message response with the interval, the emergency mode controller circuit 370 may record that the component is unable to support the selected emergency mode communication so that communications may be routed and/or switched and/or transported accordingly and/or given other suitable treatment. In some embodiments according to the invention, the emergency mode controller circuit 370 may reissue the emergency message and/or send one or more subsequent emergency messages to the nonresponsive components.

In operation, the emergency mode controller circuit 370 may receive modified emergency state information from the monitor circuit 110 and may thereby adjust the emergency mode communication supported by the network 10 by issuing different emergency messages to adjust the type of communications that are currently supported by the network 10. Accordingly, emergency mode controller circuit 370 can adjust the emergency communications based on the emergency state information reported thereto so that more users and/or less users and/or specific sets or categories of users may have access to the network in emergency situations. For example, if an emergency worsens and/or the communications network is otherwise in danger of immanent failure, user access may be limited to just the most important sets of users such as emergency responders (e.g., police and fire personnel) and perhaps users who subscribe to a service provider's highest cost premium services.

Figure 4:
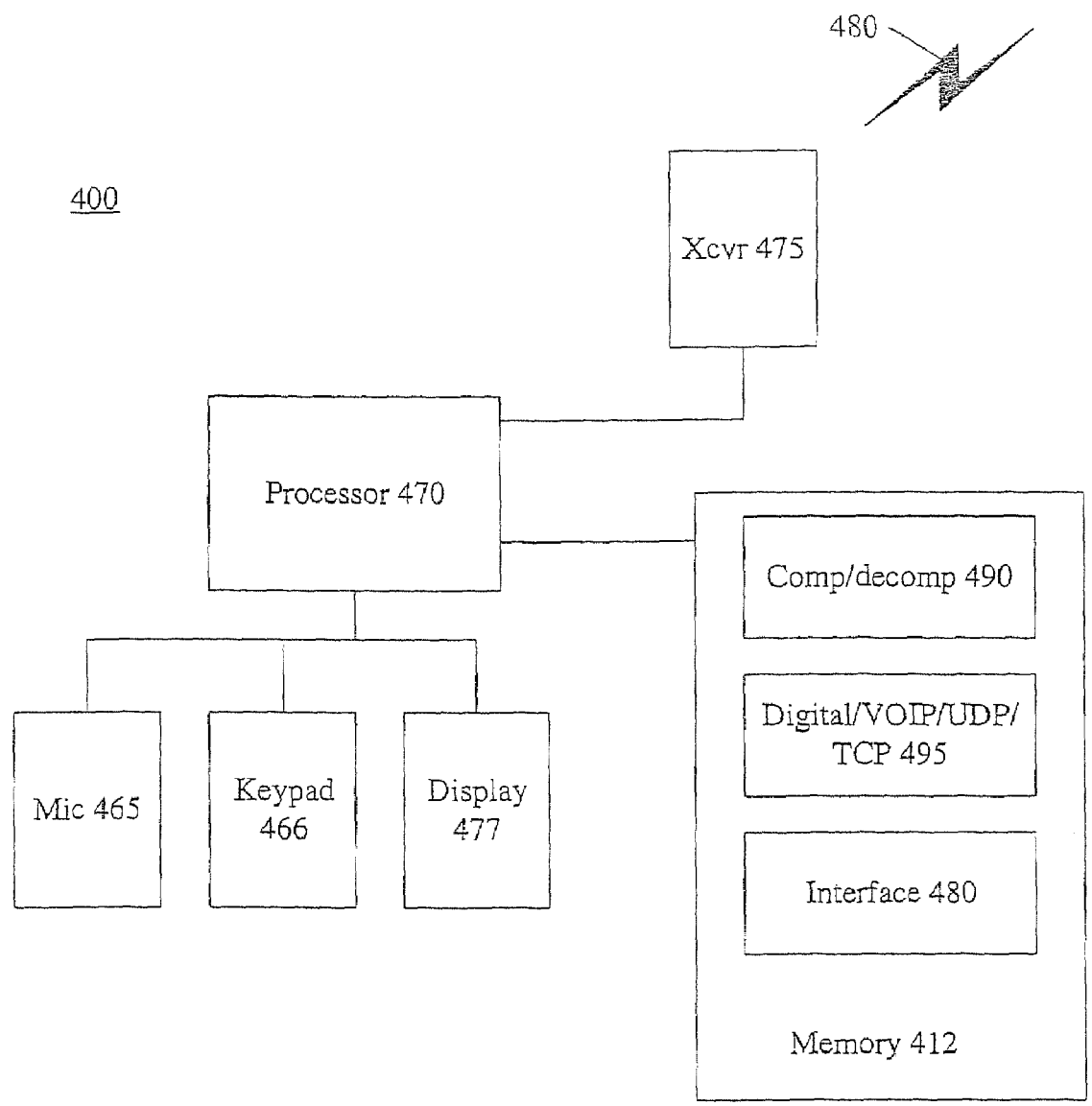
FIG. 4 is a block diagram that illustrates user terminals according to some embodiments in the invention.

FIG. 4 is a block diagram of a user terminal 400 according to some embodiments of the invention. As shown in FIG. 4, the user terminal 400 includes a processor circuit 470 that coordinates overall operation of the user terminal 400 including input/output operations as well as communications via a communications channel 480 to the network 10. In particular, the input/output for the user terminal 400 may be provided by a microphone 465, a keypad 466 and a display 477. The components used to provide the input/output for the user terminal 400 can be any types of components suitable for providing the types of input/output described herein.

The user terminal 400 further includes a memory 412 that can include computer readable code that is configured to operate the user terminal 400 in accordance with emergency communication modes described herein. In particular, in some embodiments according to the invention, the memory 412 includes compression/decompression software that can be used to provide compression and decompression of audio data provided to/from the network 10 via the channel 480. Accordingly, the compression/depression software 490 can be used in the reduced audio mode so that less bandwidth may be used by the user terminal 400 to conduct a reduce quality audio call. The memory 412 further includes data to support a general packet radio service 495 which is typically used when providing communications from the user terminal to a network, such as the Internet via a gateway, so that applications, such as voice over IP (VOIP), may be supported. In such embodiments according to the invention, the user terminal 400 may utilize a UDP or TCP type protocol as part of a VOIP protocol which can reduce the amount of bandwidth required of the network 10 operating in reduced audio mode.

The memory 412 can also include computer readable codes configured to support text messaging as described herein so that the user terminal 400 may communicate with the network 10 using commonly known keypad strokes that are understandable to other users familiar with text messaging. It will be understood that the text messaging may also utilize less bandwidth than normal operations.

Still referring to FIG. 4, the memory 412 further includes computer code that is configured to provide a series of menus that provide the user (via the display 477) with a variety of predetermined messages (such as "I'm okay" or "Let's meet at home later") so that users unfamiliar with text messaging may nonetheless access the network 10 in reduced text mode to communicate with other users. The menus may specify hot keys or abbreviations that can be selected via the keypad 466 to initiate the transmission of the corresponding messages. In some embodiments according to the invention, the user terminal 400 may include the ability to reorganize the menus based on historical use so that it may be more convenient for the user to transmit commands which are more likely to be transmitted by that particularly user.

Figure 5:
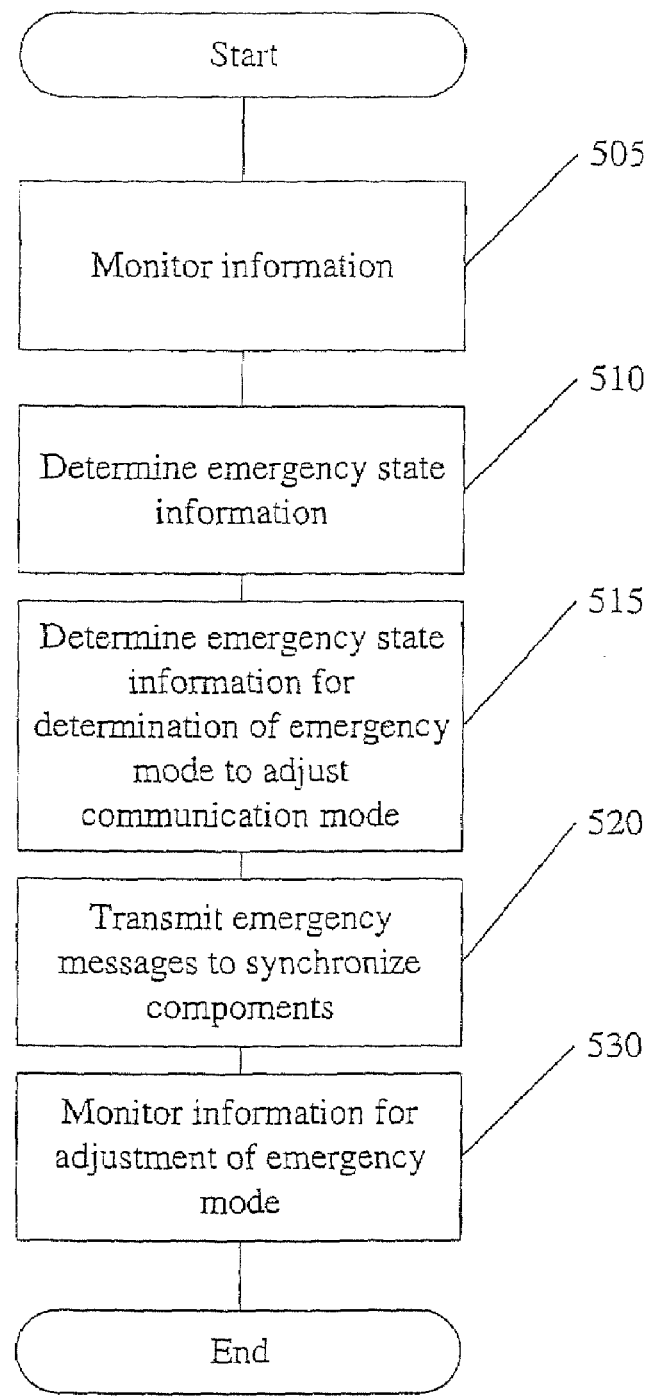
FIG. 5 is a flowchart that illustrates operations of communication systems according to some embodiments in the invention.

FIG. 5 is a flow chart that illustrates operations of systems according to some embodiments of the invention. In particular, information that may be associated with the existence of an emergency is monitored (Block 505). In some embodiments according to the invention, the information monitored can also be authenticated and filtered to provide a more valid indication of the likelihood that an emergency exists (Block 510). The emergency state information provided by the monitoring can be used to determine an emergency mode (Block 515) that is deemed to be appropriate given the likelihood/severity indicated by the emergency state information. The selected emergency mode can be initiated by the transmission of an emergency message to devices in the network to adjust communications mode based on the monitored emergency information. The broadcast of the emergency messages to the devices in the network allows those devices to be synchronized with one another (Block 520). Accordingly, the synchronized devices within the network 10 are able to communicate with one another using the activated emergency communications mode indicated by the emergency messages. The information used to determine the emergency state information continues to be monitored so that any adjustments to the communications mode can be made in view of the changing emergency information (Block 530).

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed is:

1. A mobile user terminal for use in a broadband wireless communications network comprising:

a transceiver configured to transmit/receive communications to the broadband wireless communications network according to an emergency communications mode; and a processor circuit coupled to the transceiver circuit configured to activate the emergency communications mode for communications by the mobile user terminal responsive to an emergency message received from the broadband wireless communications network based on emergency state information used by a mode controller circuit to determine which emergency communications mode is to be activated by the mobile user terminal, wherein the emergency communications mode is selected by the mode controller circuit from a listing of emergency modes consisting of a limited audio mode, a text mode, a limited text mode, and a limited video mode.

2. A user terminal according to claim 1 wherein the emergency communications mode further comprises a shortcut based communication mode to be used in limited text mode, a hotkey based communication mode to be used in limited text mode, an abbreviation based communication mode to be used in limited text mode, and/or a communications mode having a predetermined number of messages and/or amount of time allocated for use.

\* \* \* \* \*